No. 615,511. Patented Dec. 6, 1898.
A. WEINHOLD.
SELF OILING BEARING.
(Application filed May 26, 1898.)

(No Model.) 3 Sheets—Sheet 1.

WITNESSES: INVENTOR:
Wm. D. Bell. Auguste Weinhold
Louise Snyder by Partner & bo
 Attys.

No. 615,511. Patented Dec. 6, 1898.
A. WEINHOLD.
SELF OILING BEARING.
(Application filed May 26, 1898.)

(No Model.) 3 Sheets—Sheet 3.

WITNESSES:
Wm. D. Bell.
Louise Snyder.

INVENTOR:
Auguste Weinhold
by Gartner & Co. Attys.

UNITED STATES PATENT OFFICE.

AUGUSTE WEINHOLD, OF LOUVAIN, BELGIUM.

SELF-OILING BEARING.

SPECIFICATION forming part of Letters Patent No. 615,511, dated December 6, 1898.

Application filed May 26, 1898. Serial No. 681,762. (No model.)

*To all whom it may concern:*

Be it known that I, AUGUSTE WEINHOLD, mill-manager, a citizen of Germany, residing at Louvain, in the Kingdom of Belgium, have invented a self-oiling bearing with a pedestal in the form of a double bell and a lubricator penetrating into said pedestal fixed on the shaft and encompassing the friction-surface of the pedestal, of which the following is a specification.

My invention has reference to lubricating devices; and it relates particularly to devices of this nature which are self-acting and which are adapted for bearings the axis of rotation in which are vertically arranged.

The object of my invention is to provide a lubricating device of the kind referred to which shall feed in a regular and even manner, which shall be so constructed as to provide protection to the lubricating substance from flying particles of dust, &c., and which shall at the same time be simple in construction and easily accessible for cleaning, &c.

My invention consists in the improved lubricating device, in the combination and arrangement of the parts thereof, so as to produce simplicity of construction and efficiency in operation, and also in the combination of the device with a vertical shaft and its bearings.

My invention is fully illustrated in the accompanying drawings, in which—

Figure 1:
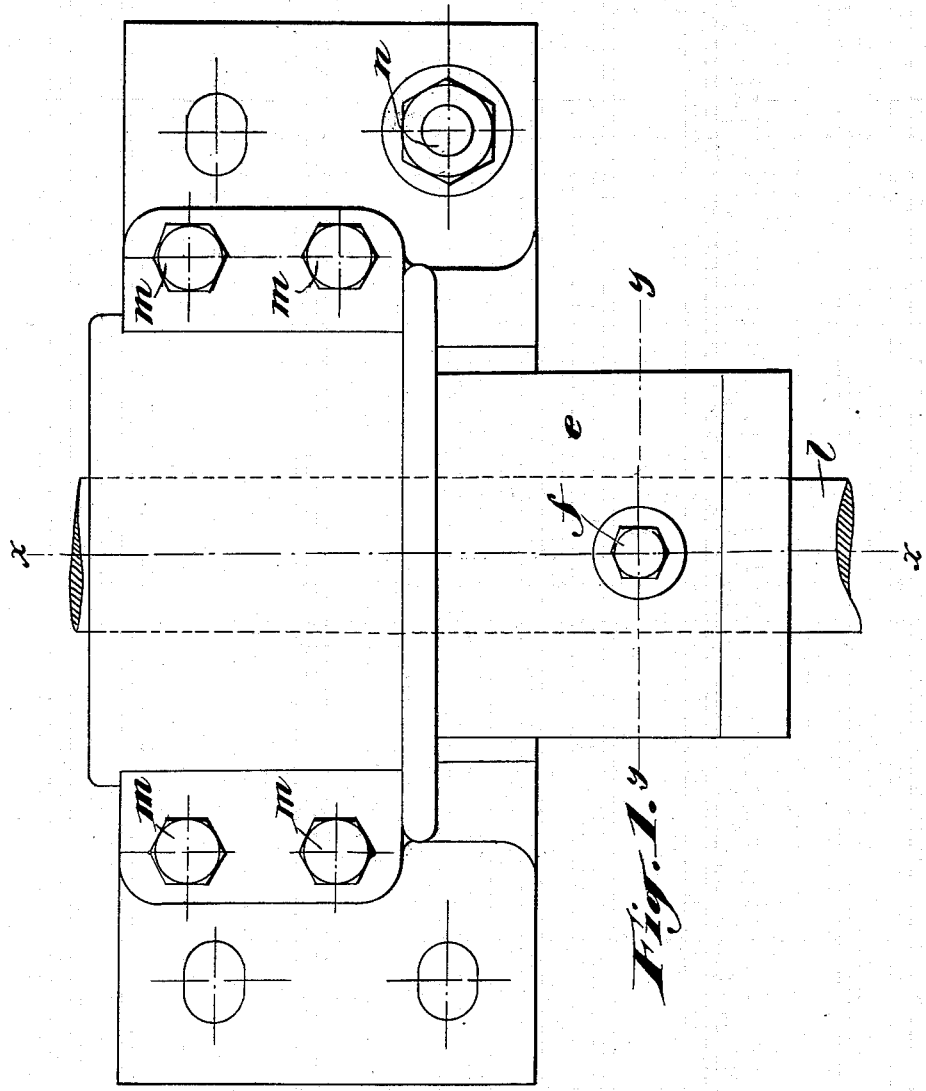
Figure 2:
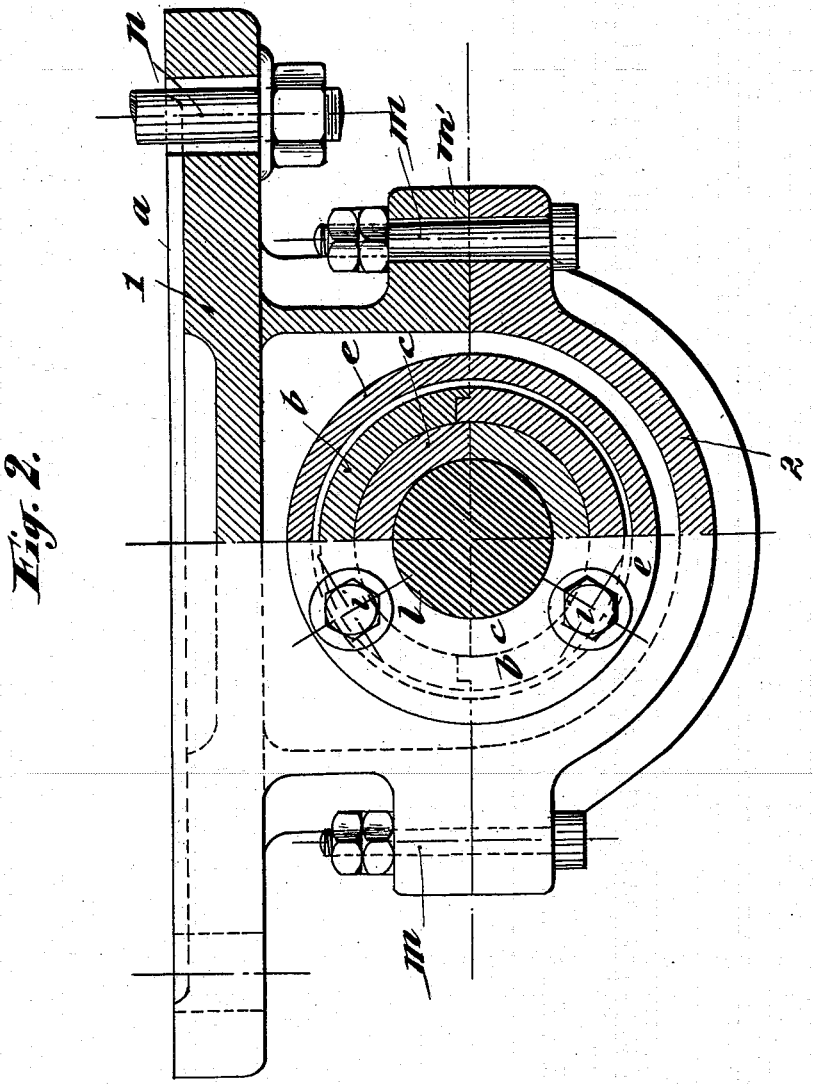
Figure 3:
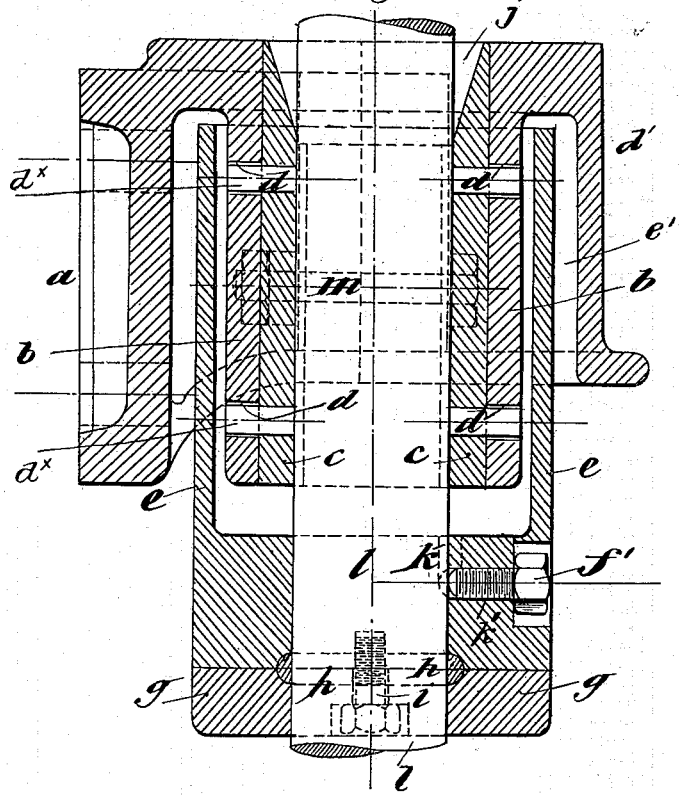
Figure 4:
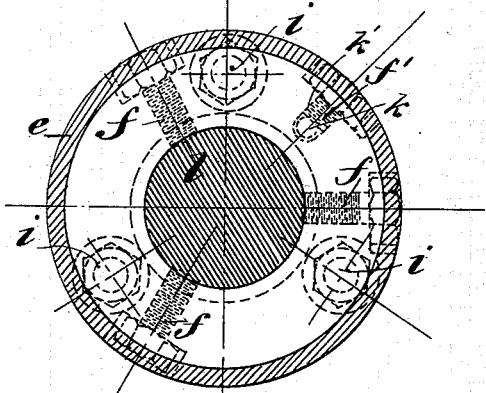

Figure 1 is a view in front elevation of the bearings for a vertical shaft provided with my improved lubricating device. Fig. 2 is a top view, one-half in section and one-half in elevation, of the mechanism shown in Fig. 1. Fig. 3 is a vertical section of the mechanism shown in Fig. 1 and taken on the line $x\ x$ of said figure; and Fig. 4 is a horizontal sectional view of the mechanism shown in Fig. 1 and taken on the line $y\ y$ of said figure.

In said drawings the letter $l$ indicates a vertical shaft, which at its lower end is supported in any suitable manner and which at its upper end is sustained in position by a suitable bracket $a$, consisting of two sections 1 and 2, the former of which is secured in position by bolts $n$ and both of which are held together by means of bolts $m$, penetrating ears $m'$. Adjustably secured on the shaft in any desired manner, as by set-screws $f$, is an oil-cup $e$, which is penetrated by said shaft and which surrounds the same. The joint between the shaft and the bottom of the oil-cup where the shaft penetrates the same is made proof against the escape of oil at this point by a packing $h$, closely fitting the shaft and held against the same in an annular recess formed at the internal meeting edges of the bottom of the cup and a collar $g$, secured to the cup by any suitable means—as, for instance, screws $i$.

The journal-box $b$ for the shaft is preferably formed integral with the bracket $a$ and projects down into said cup, being lined with a babbitt or other suitable antifriction metallic sleeve $c$, whose upper end is chamfered out, as at $j$, downwardly to a point approximately as far as the top of the cup. The oil contained in the cup is afforded access to the shaft through the openings $d$, penetrating both the journal-box and the sleeve $c$, and in which openings pins $d^\times$ are arranged, so as to sustain the sleeve in position. By chamfering the upper portion of the sleeve $c$ down as far as the top of the cup only that portion of the shaft is in contact with said sleeve which is beneath the surface of, and hence susceptible of being reached by, the oil.

The box $b$ carries an integral hood $d'$, between whose side wall and the wall of box $b$ is a recess $e'$, in which fits loosely without contact at any point the upper portion of the wall of the cup. This hood is adapted to prevent the admission of flying particles of dust and other foreign matter to the contents of the cup, and consequently the bearings.

Means for drawing off the oil or other lubricating liquid contained by the cup is provided through passages $k$, (shown in dotted lines,) communicating with the screw-hole $k'$, in which fits a screw $f'$, which when in place shuts off exterior communication to the cup through its bottom wall.

I have shown the shaft as having a sustaining-bracket that is so formed as to bring the former close to the wall, beam, &c., to which it may be revolubly secured by said bracket merely for the sake of compactness on the drawings. Though this form of bracket may be suitable where the shaft is peculiarly adapted to some specific purpose, it is obvious that for general purposes it would be preferable to construct the bracket so as to bring the bearings for the shaft farther from the wall. Hence I do not wish to be limited to the specific form of bracket which I have shown.

The operation of the device will be obvious. It might be stated, however, that whenever it is desired to fill the cup or clean the parts, &c., it is only necessary to release the set-screws supporting the cup, so as to permit the same to be dropped down on the shaft to expose the interior of the device.

Having thus fully described my invention, what I claim, and desire to secure by Letters Patent of the United States, is—

The combination with a vertical shaft, its support and a journal-box therefor integral with said support, of an oil-cup adjustably carried on said shaft and surrounding the same and said journal-box, an antifriction metallic sleeve situated between said shaft and the journal-box, extending to the top of the same and chamfered downwardly from its inner top edge as far as the plane of the top of said cup, said journal-box and the sleeve being provided with passages establishing communication between the oil-cup and the shaft, and a hood formed integral with said journal-box and receiving the upper portion of said cup, substantially as described.

In testimony that I claim the foregoing I have hereto set my hand this 5th day of May, 1898.

AUGUSTE WEINHOLD.

Witnesses:
P. POHLIN,
GREGORY PHELAN.